United States Patent
Lee et al.

(10) Patent No.: US 8,343,325 B2
(45) Date of Patent: Jan. 1, 2013

(54) ELECTRODIALYSIS APPARATUS AND ELECTRODIALYSIS METHOD USING THE SAME

(75) Inventors: Hun-joo Lee, Yongin-si (KR); Soo-suk Lee, Yongin-si (KR); Joon-ho Kim, Yongin-si (KR); Sung-ouk Jung, Yongin-si (KR); In-ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1277 days.

(21) Appl. No.: 11/737,448

(22) Filed: Apr. 19, 2007

(65) Prior Publication Data

US 2008/0073214 A1    Mar. 27, 2008

(30) Foreign Application Priority Data

Sep. 26, 2006  (KR) .................. 10-2006-0093715

(51) Int. Cl.
  *B01D 61/44*  (2006.01)
(52) U.S. Cl. .................. 204/543; 204/544; 204/627
(58) Field of Classification Search .......... 204/543–544, 204/627
See application file for complete search history.

(56) References Cited

U.S. PATENT DOCUMENTS

| | | | | |
|---|---|---|---|---|
| 1,915,568 A | * | 6/1933 | Gortner et al. | 204/544 |
| 2,176,343 A | * | 10/1939 | Howard | 204/544 |
| 3,269,933 A | * | 8/1966 | Mahoney et al. | 204/628 |
| 3,488,276 A | * | 1/1970 | Tarsey | 204/633 |
| 4,160,713 A | * | 7/1979 | Matsuzaki et al. | 204/519 |
| 4,243,501 A | | 1/1981 | Wright, Jr. | |
| 4,311,575 A | | 1/1982 | Matsuzaki et al. | |
| 4,407,942 A | | 10/1983 | Birnboim | |
| 5,437,774 A | * | 8/1995 | Laustsen | 204/518 |
| 6,284,117 B1 | | 9/2001 | Smolko et al. | |
| 6,461,491 B1 | | 10/2002 | Hryn et al. | |

FOREIGN PATENT DOCUMENTS

| | | |
|---|---|---|
| EP | 1 672 059 A1 | 6/2006 |
| EP | 1 865 075 A1 | 12/2007 |
| JP | 53-062786 | 6/1978 |
| JP | 55-044352 | 3/1980 |
| JP | 58-189003 | 11/1983 |
| JP | 01107809 | 4/1989 |
| WO | 9306261 | 4/1993 |

OTHER PUBLICATIONS

Korean Office Action dated Jul. 27, 2007 for Application No. 10-2006-0093715.
European Search Report dated Feb. 22, 2008; Application No. 07104894.6-2213.

* cited by examiner

*Primary Examiner* — Arun S Phasge
(74) *Attorney, Agent, or Firm* — Cantor Colburn LLP

(57) ABSTRACT

An electrodialysis apparatus includes a sample chamber including first and second dialysis membranes and filled with a sample between the first dialysis membrane and the second dialysis membrane, an anode chamber including an anode and filled with a first chamber solution between the anode and the first dialysis membrane, and a cathode chamber including a cathode and filled with a second chamber solution between the cathode and the second dialysis membrane. In particular, when a voltage is applied to the anode and the cathode, ionic materials of the sample move to the anode and cathode chambers.

29 Claims, 3 Drawing Sheets

US 8,343,325 B2

ELECTRODIALYSIS APPARATUS AND ELECTRODIALYSIS METHOD USING THE SAME

This application claims priority to Korean Patent Application No. 10-2006-0093715, filed on Sep. 26, 2006, and all the benefits accruing therefrom under 35 U.S.C. §119, the contents of which in its entirety are herein incorporated by reference.

BACKGROUND OF THE INVENTION

1. Field of the Invention

The present invention relates to an electrodialysis apparatus and an electrodialysis method using the same. More particularly, the present invention relates to an electrodialysis apparatus that improves electrodialysis efficiency, and an electrodialysis method using the same.

2. Description of the Related Art

A polymerase chain reaction ("PCR") is generally an artificial gene amplification method. In brief, single deoxyribonucleic acid ("DNA") strands, which are obtained by consecutively separating DNA double helixes, are heated and cooled using a heat-stable DNA polymerase, so that the single DNA strands can be used as templates for forming new double helixes. More specifically, double-stranded DNA is heated so as to be separated into single DNA strands. Primers, which are short pieces of DNA, are added to the single DNA strands and cooled, so that the primers combine with the single DNA strands. A DNA polymerase is added to the single DNA strands with the primers, and the DNA polymerase initiates DNA replication from the primers. Repeating this cycle more than several tens of times allows DNA to be replicated to more than several billions of DNA within a short period of time.

In general, a bodily fluid in a human body-related PCR becomes a PCR sample. However, a PCR inhibitor existing within the bodily fluid reduces PCR efficiency to a great extent. Salt and red blood cells ("RBCs") are representative examples of such a PCR inhibitor. For instance, exemplary materials having salt include sodium chloride (NaCl) and sodium sulphate ($Na_2SO_4$). Blood or urine, which is a PCR sample, has a high content of salt or RBCs.

When DNA of bacteria, which causes septicemia, is to be amplified or detected from blood of a patient associated with septicemia, it is usually necessary to separate this target bacterial DNA from the blood sample in order to effectively amplify or detect the target bacterial DNA. That is, a PCR inhibitor needs to be removed from the blood sample.

Direct use of the non-diluted whole blood as a PCR sample is limited because the non-diluted whole blood contains a substantial amount of PCR inhibitors. Generally, PCR efficiency decreases when about 2% of blood is contained within the total reaction solution.

One approach to overcome this limitation is a method of selectively destroying RBCs. For instance, U.S. patent application Ser. No. 4,407,942 issued to H. C. Birnboim on Oct. 4, 1983, entitled "Fluorescent Detection of DNA Damage" teaches a method of selectively destroying RBCs using ammonium chloride. However, this conventional method of removing PCR inhibitors from a sample except for target DNA may be very complex and take a long time. Also, the sample is likely to be contaminated while separating the target DNA from the sample.

BRIEF SUMMARY OF THE INVENTION

An apparatus and method that can effectively remove a polymerase chain reaction ("PCR") inhibitor are thus provided to allow a direct and simple PCR using the whole blood.

The present invention provides an apparatus and a method that can improve the efficiency of a PCR, which often decreases due to a PCR inhibitor when a direct PCR is executed using the whole blood.

According to exemplary embodiments of the present invention, there is provided an electrodialysis apparatus, including a sample chamber including first and second dialysis membranes and filled with a sample between the first dialysis membrane and the second dialysis membrane, an anode chamber including an anode and filled with a chamber solution between the anode and the first dialysis membrane, and a cathode chamber including a cathode and filled with a chamber solution between the cathode and the second dialysis membrane, wherein, when a voltage is applied to the anode and the cathode, ionic materials of the sample move to the anode and cathode chambers.

The first and second dialysis membranes may each include a molecular weight cutoff membrane. The molecular weight cutoff membrane may include one of a cellophane membrane, a cellulose membrane, a polyether sulfone ("PES") membrane, a polysulfone ("PS") membrane, a polyvinylidene fluoride ("PVDF") membrane, and a combination including at least one of the foregoing.

The chamber solutions may include deionized water.

The electrolysis apparatus may further include a control block controlling an ionic concentration of each of the anode chamber and the cathode chamber to be lower than a reference ionic concentration. The control block may replace substantially an entirety of at least one of the chamber solution in the anode chamber and the chamber solution in the cathode chamber with new chamber solution if the ionic concentration of the anode chamber or the cathode chamber is higher than the reference ionic concentration. The reference ionic concentration may be lower than an ionic concentration of the sample chamber. The control block may include a sensor unit sensing the ionic concentrations of the anode chamber, the cathode chamber, and the sample chamber, and a pump supplying chamber solutions to the anode chamber and the cathode chamber or discharging chamber solutions from the anode chamber and the cathode chamber. The sensor unit may sense the ionic concentrations of the anode chamber, the cathode chamber, and the sample chamber by measuring electrical resistance or electrical conductivity of each of the anode chamber, the cathode chamber, and the sample chamber.

The electrodialysis apparatus may further include a mixing block causing the chamber solution of the anode chamber and the chamber solution of the cathode chamber to flow. The mixing block may generate bubbles inside the anode and cathode chambers. The anode and the cathode may be spaced apart from each other within a minimum distance range allowing smooth flux of the chamber solutions within the anode chamber and cathode chamber around the first and second dialysis membranes, respectively.

The sample chamber may be formed in a tetragonal shape attachable to or detachable from a space between the anode chamber and the cathode chamber. The sample chamber may include opposing walls having dialysis windows formed therein, the first and second dialysis membranes exposed to the chamber solutions through the dialysis windows.

According to other exemplary embodiments of the present invention, an electrodialysis apparatus includes a housing filled with chamber solutions, an anode and a cathode spaced apart from each other inside the housing and generating an electrical field, and a sample chamber filled with a sample between dialysis membranes of the sample chamber and attachable to or detachable from the housing, wherein each of the dialysis membranes forms a wall isolating a corresponding chamber solution from the sample, and ionic materials contained in the sample move to the chamber solutions through corresponding dialysis membranes due to the electric field. The dialysis membranes may each include a molecular weight cutoff membrane. The chamber solutions may include deionized water.

The electrodialysis apparatus may further include a control block controlling ionic concentrations of the chamber solutions to be lower than a reference ionic concentration. The control block may replace substantially an entirety of at least one of the chamber solutions with new chamber solution if the ionic concentration of at least one of the chamber solutions is substantially equal to or higher than the reference ionic concentration. The reference ionic concentration may be lower than an ionic concentration of the sample. The control block may sense the ionic concentrations of the chamber solutions by measuring electrical resistance or electric conductivity of each of the chamber solutions and sample.

The electrodialysis apparatus may further include a mixing block generating bubbles to make the chamber solutions flow.

The sample chamber may be formed in a tetragonal shape, and the dialysis membranes may be formed on opposing sides of the sample chamber.

According to other exemplary embodiments of the present invention, an electrodialysis apparatus includes an anode and a cathode generating an electric field, first and second dialysis membranes, first and second chamber solutions, and a sample, wherein the first chamber solution, the first dialysis membrane, the sample, the second dialysis membrane, and the second chamber solution are arranged in sequential order between the anode and the cathode, ionic materials contained in the sample are dialyzed into the first and second chamber solutions due to the electric field, and the first and second dialysis membranes include a molecular weight cutoff membrane.

The electrodialysis apparatus may further include a control block replacing substantially an entirety of at least one of the first and second chamber solutions with new chamber solution if the at least one of the first and second chamber solutions has an ionic concentration substantially same as or higher than a reference ionic concentration.

The electrodialysis apparatus may further include a mixing block generating bubbles removing dialysis interference layers formed at interfaces between the first dialysis membrane and the first chamber solution and between the second dialysis membrane and the second chamber solution.

The anode and the cathode may be spaced a minimum distance apart from each other.

According to further exemplary embodiments of the present invention, an electrodialysis method includes arranging a first chamber solution, a first dialysis membrane, a sample, a second dialysis membrane, and a second chamber solution in sequential order in between an anode and a cathode that are generating an electric field, and dialyzing ionic materials contained in the sample into the first and second chamber solutions based on the electric field, wherein the first and second dialysis membranes include a molecular weight cutoff membrane.

The electrodialysis method may further include replacing substantially an entirety of the first or second chamber solution with new chamber solution if the first or second chamber solution has an ionic concentration substantially same as or higher than a reference ionic concentration.

The method may further include generating bubbles moving the first and second chamber solutions due to the bubbles.

The method may further include spacing the anode and the cathode a minimum distance from each other in order to maximize intensity of the electric field.

The method may further include filling the sample between the first dialysis membrane and the second dialysis membrane in an integral cartridge type form of chamber, and attachable to or detachable from a space between the first chamber solution and the second chamber solution.

Arranging the sample may include arranging one of whole blood or urine and dialyzing ionic materials contained in the sample may include removing a majority of PCR inhibitors within the sample in less than ten minutes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
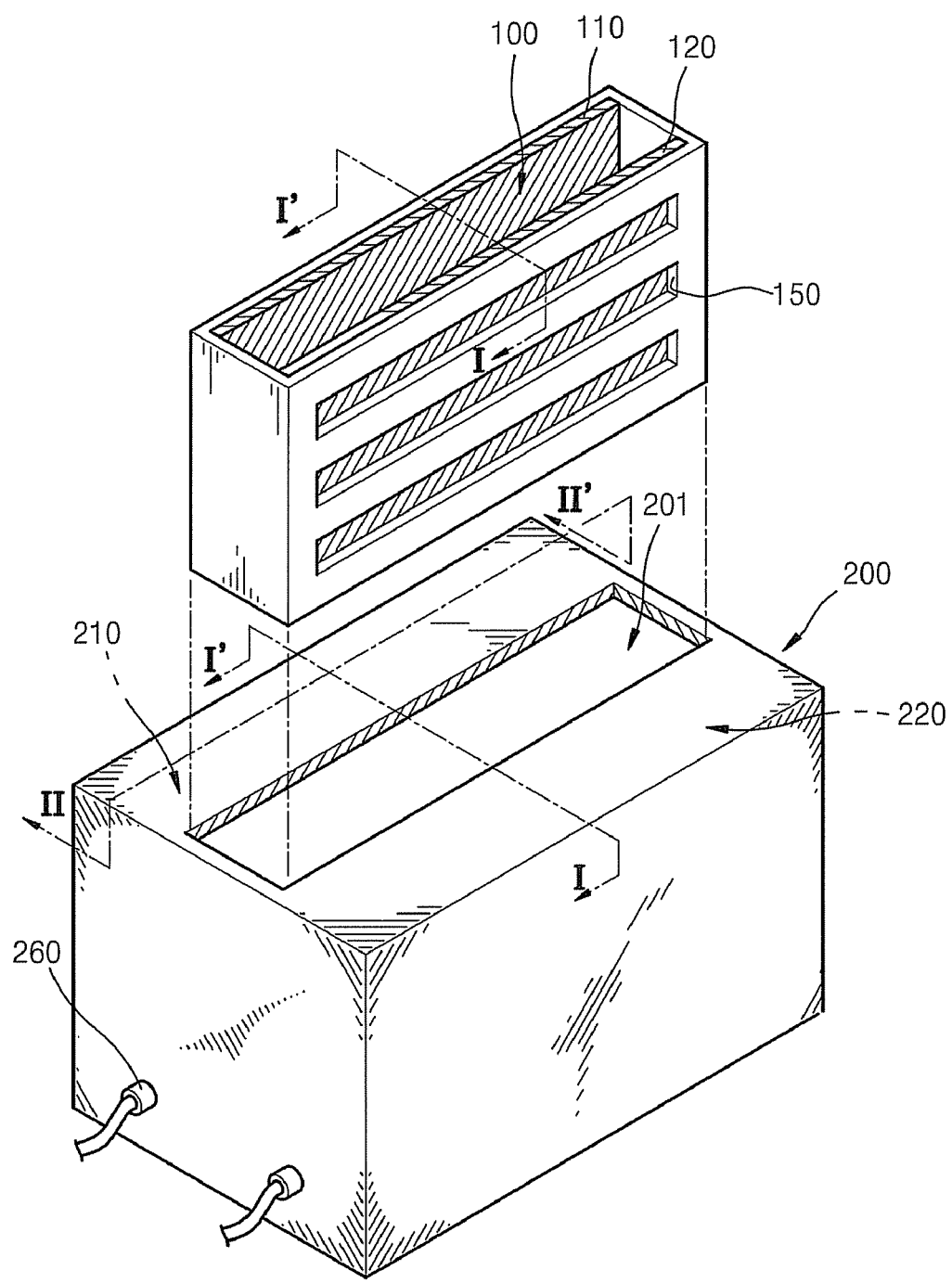
FIG. 1 illustrates a perspective view of an exemplary electrodialysis apparatus, with an exemplary sample chamber detached from an exemplary housing, according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those of ordinary skill in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

When a direct polymerase chain reaction ("PCR") is conventionally performed without diluting the whole blood, a substantial amount of blood cells and salt usually act as PCR inhibitors, and thus, a PCR can be performed using only a low concentration of blood. However, according to an exemplary embodiment of the present invention, since the whole blood is electrically dialyzed and used as a blood sample, a direct PCR can be performed using a high concentration of blood.

In general, blood contains various types of salt, and particularly, a high concentration of salt exists in urine and blood. Hereinafter, the term "ionized material" refers to ionized salt since salt is dissolved in a solution and ionized thereafter. When salt in the blood is removed by electrodialysis, red blood cells ("RBCs"), which are the main parts of PCR inhibitors, are destroyed due to osmotic pressure. That is, electrodialysis of salt allows for the removal of most of the PCR inhibitors such as salt and blood cells. Thus, the whole blood can be used as a PCR sample, and this effect results in an improvement in PCR efficiency to a great extent.

It usually takes a long time to dialyze a bodily fluid using a conventional dialysis method. However, in the present exemplary embodiment, instead of simple conventional dialysis of the blood, the blood is electrically dialyzed by applying an electric field to the blood. This electrodialysis can shorten a dialysis time of the blood.

FIG. 1 illustrates a perspective view of an exemplary electrodialysis apparatus where an exemplary sample chamber 100 is removed from an exemplary housing 200 according to an exemplary embodiment of the present invention. The sample chamber 100 is filled with a sample, and first and second dialysis membranes 110 and 120 become the outer walls of the sample. That is, the first and second dialysis membranes 110 and 120 are formed on an interior of opposing walls of the sample chamber 100 to essentially become the outer walls of the sample. The sample chamber 100 is formed in a tetragonal cross-sectional shape, such as having a rectangular prism shape, and installed in a housing 200 so as to contain a sample prior to electrodialysis. When the electrodialysis of the sample is completed, the sample chamber 100 is separated from the housing 200. The housing 200 preferably includes a slot 201 for attachment and detachment, i.e. insertion and removal, of the sample chamber 100. Also, dialysis windows 150 are preferably provided on opposing sides of the sample chamber 100 to allow the first and second dialysis membranes 110 and 120 to face respective chamber solutions. Bubbles are also generated within the chamber solutions, and the bubbles cause the chamber solutions to flow, so that electrodialysis efficiency can be improved. For this effect, air supply openings 260 are formed through the housing 200 in order to provide air inside the housing 200.

Figure 2:
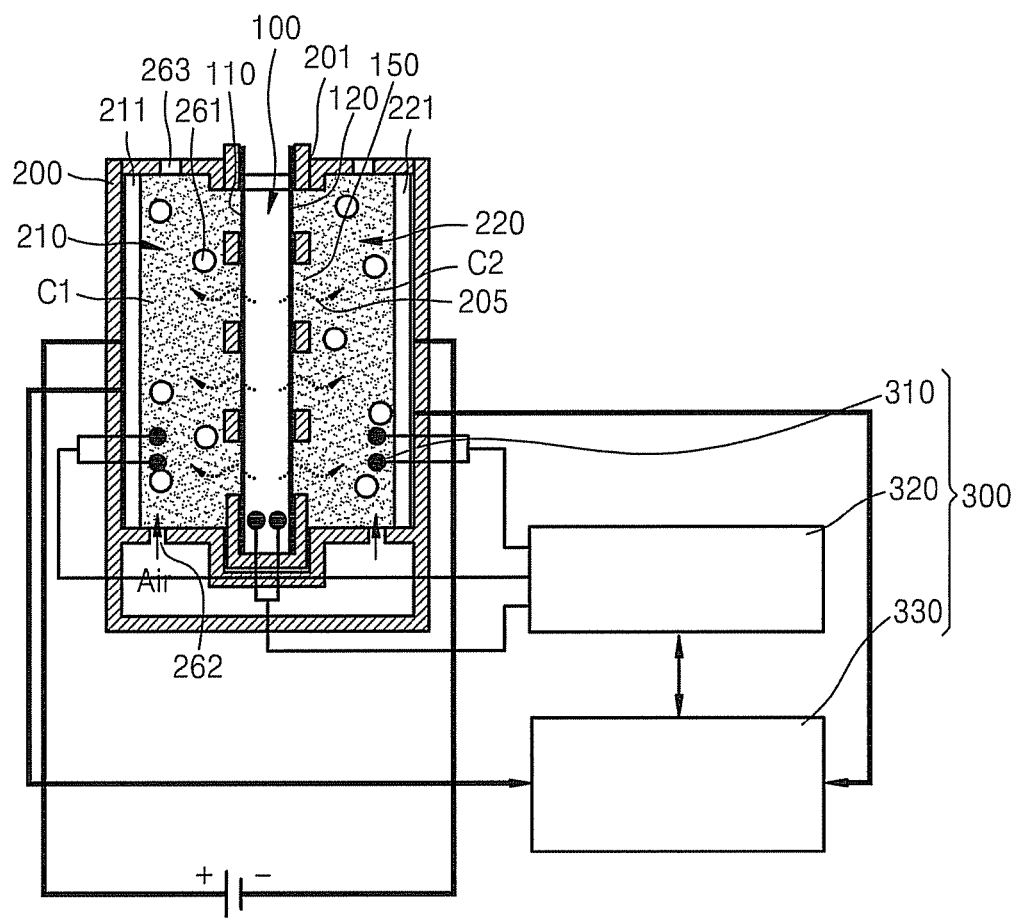
FIG. 2 is a schematic and sectional view of the exemplary electrodialysis apparatus, with the exemplary sample chamber attached to the exemplary housing, and taken along line I-I' illustrated in FIG. 1.
Figure 3:
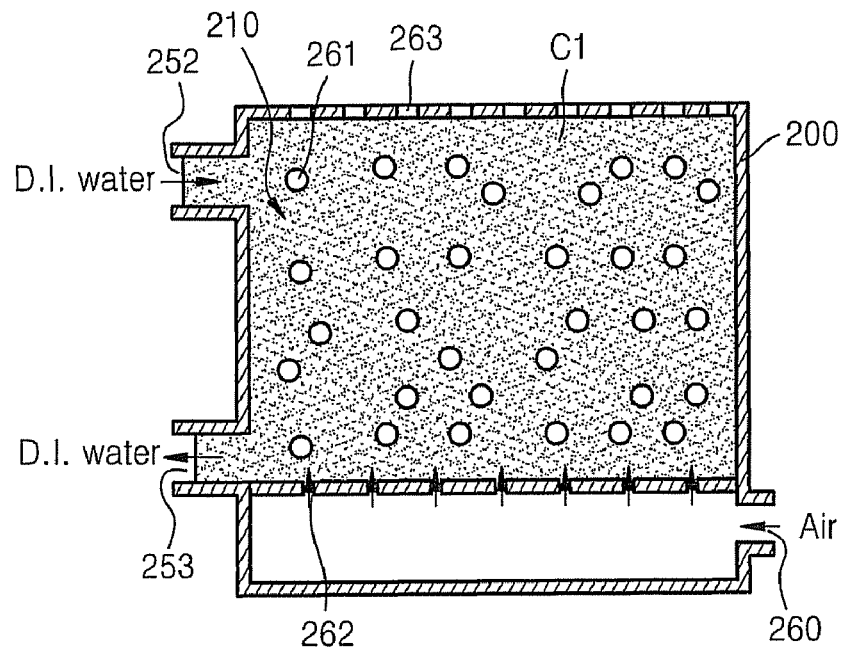
FIG. 3 is a sectional view of the exemplary electrodialysis apparatus taken along line II-II' illustrated in FIG. 1.

FIG. 2 illustrates the exemplary electrodialysis apparatus of FIG. 1 having the sample chamber 100 within the housing 200, and taken along line I-I' illustrated in FIG. 1. FIG. 3 illustrates the exemplary electrodialysis apparatus of FIG. 1 taken along line II-II' illustrated in FIG. 1. Referring to FIGS. 2 and 3, the electrodialysis apparatus according to the present embodiment includes the sample chamber 100, the housing 200, a control block 300, and a mixing block, which will now be described in detail.

The housing 200 is an outer part of the electrodialysis apparatus. An anode chamber 210 and a cathode chamber 220 are formed inside the housing 200 on opposing sides of the sample chamber 100. An anode 211 is placed inside the anode chamber 210, and a first chamber solution C1 fills the anode chamber 210. The first chamber solution C1 faces the sample within the sample chamber 100 by having the first dialysis membrane 110 therebetween. A cathode 221 is placed inside the cathode chamber 220, and a second chamber solution C2 fills the cathode chamber 220. The second chamber solution C2 faces the sample within the sample chamber 100 by having the second dialysis membrane 120 therebetween. Although the first and second chamber solutions C1 and C2 may have different compositions, the first and second chamber solutions preferably have substantially the same composition. In exemplary embodiments of the first and second chamber solutions C1 and C2, deionized water is used to improve the electrodialysis efficiency. When a positive voltage is applied to the anode 211, and a negative voltage is applied to the cathode 221, an electric field is generated. Due to the electric field, ionic materials 205 of the sample, as indicated by the curved arrows exiting the sample chamber 100, move to the anode chamber 210 and to the cathode chamber 220, resulting in electrodialysis of salt in the sample.

Figure 4:
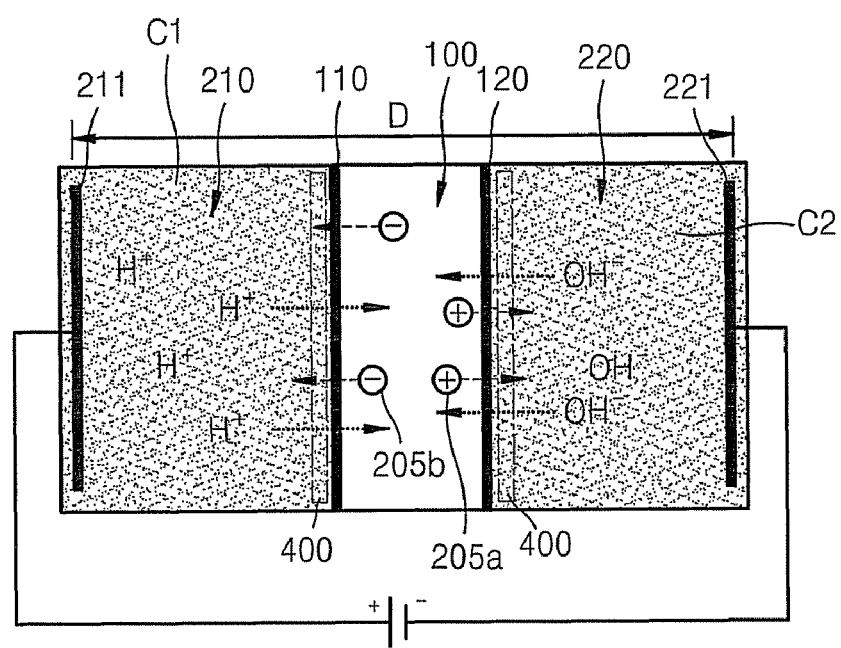
FIG. 4 is a diagram illustrating an electrolyzed state of chamber solutions as ionic materials of a sample are transferred into the chamber solutions.

FIG. 4 is a diagram illustrating an electrically dialyzed state of the first and second chamber solutions C1 and C2 as the ionic materials 205 of the sample within the sample chamber 100 move to the first and second chamber solutions C1 and C2 within the housing 200. The first chamber solution C1, the first dialysis membrane 110, the sample, the second dialysis membrane 120, and the second chamber solution C2 are sequentially arranged between the anode 211 and the cathode 221, which generate an electric field. Due to the electric field, the ionic materials 205 of the sample are electrically dialyzed into the first and second chamber solutions C1 and C2. Positively charged ionic materials 205a move to the cathode 221 to which a negative voltage is applied, while negatively charged ionic materials 205b move to the anode 211 to which a positive voltage is applied.

When the ionic materials 205 move to the first and second chamber solutions C1 and C2, an initial state of deionized water in each of the first and second chamber solutions C1 and C2 is changed to an ionized state. As the deionized water is electrically dialyzed, the amounts of hydrogen ions ($H^+$) and hydrogen oxide ions ($OH^-$) increase. If an ionic concentration of each of the first and second chamber solutions C1 and C2 containing the hydrogen ions ($H^+$) and hydrogen oxide ions ($OH^-$) reaches above the ionic concentration of the sample, then the ionic materials 205 would move back to the sample, and thus, the ionic concentration of the sample may increase. To prevent this from occurring, an ion exchange membrane that selectively blocks the movement of positive and negative ions may be used as the first and second dialysis membranes 110 and 120 in order to prevent the increase in the ionic concentration of the sample. However, the ion exchange membrane is expensive.

In an exemplary embodiment of the present invention, a molecular weight cutoff membrane, which is cheaper than the ion exchange membrane, is used as the first and second dialysis membranes 110 and 120, and the control block 300 is used to maintain the ionic concentration of each of the first and second chamber solutions lower than a reference ionic concentration. The molecular weight cutoff membrane selectively passes through a material having a molecular weight less than a certain molecular weight due to a difference in concentration. Since the molecular weight cutoff membrane is well known in the art, a detailed description thereof will be omitted. Examples of the molecular weight cutoff membrane include a cellophane membrane, a cellulose membrane, a polyether sulfone ("PES") membrane, a polysulfone ("PS") membrane, and a polyvinylidene fluoride ("PVDF") membrane. If molecules that are to be electrically dialyzed are ions, the ionic materials 205 can pass through the molecular weight cutoff membrane more easily than the ion exchange membrane since the molecular weight cutoff membrane does not rely on the polarity of an ion.

The ionic materials 205 that move out of the sample cause the ionic concentrations of the first and second chamber solutions C1 and C2 to increase. Thus, a concentration difference between the first and second dialysis membranes 110 and 120 reduces, and electrodialysis efficiency decreases. Since a substantial amount of heat is generated due to the acceleration of the electrodialysis of the first and second chamber solutions C1 and C2, the first and second chamber solutions C1 and C2 or the sample are likely to be thermally destroyed. Thus, the control block 300 is provided so as to control and overcome this disadvantage, as will be further described below. The control block 300 ensures that the ionic concentrations of the anode chamber 210 and the cathode chamber 220 remain lower than a reference ionic concentration.

The amount of ions contained inside the anode chamber 210 and the cathode chamber 220 increases exponentially. Hence, when the ionic concentration of each of the first and second chamber solutions C1 and C2 exceeds a reference ionic concentration, it is preferable to replace the corresponding first or second chamber solution C1 or C2 with a new chamber solution, or both first and second chamber solutions C1 and C2 may be replaced. The reference ionic concentration is preferably set to be lower than the ionic concentration of the sample in the sample chamber 100. That is, the reference ionic concentration that is a critical value of the control block 300 used for control is preferably lower than the ionic concentration of the sample. The control block 300 replaces the first or second chamber solution C1 or C2 with a new chamber solution when the ionic concentration of the chamber solution C1 or C2 is equal to or higher than the reference ionic concentration. Alternatively, if the ionic concentration of one or both chamber solutions C1 and C2 is equal to or higher than the reference ionic concentration, then the control block 300 may replace both the first and second chamber solutions C1 and C2.

In an exemplary embodiment of the present invention, the control block 300 senses an ionic concentration of the first or second chamber solution C1 or C2 or the sample by measuring electrical resistance or electrical conductivity of the first chamber solution C1, the second chamber solution C2, or the sample. Therefore, as shown in FIG. 2, the control block 300 includes a sensor unit 310, a control unit 320, and a pump 330. The sensor unit 310 senses an ionic concentration. The pump 330 supplies and discharges the first and second chamber solutions C1 and C2. The control unit 320 controls the operation of the sensor unit 310 and the pump 330. The sensor unit 310 is placed inside of each of the anode chamber 210, the cathode chamber 220, and the sample chamber 100. The sensor unit 310 measures electrical resistance or electrical conductivity of each of the first and second chamber solutions C1 and C2, and the sample, in order to thereby estimate the ionic concentrations thereof. The sensor unit 310 then provides an indication of the ionic concentrations of the first and second chamber solutions C1 and C2, and the sample, to the control unit 320. Values that may indicate ionic concentration include measurements of electrical resistance and electrical conductivity. Since a reference ionic concentration is to be less than the ionic concentration of the sample, a corresponding value of a reference ionic concentration is used as a reference value by the control unit 320. The control unit 320 then compares the values indicative of ionic concentrations of the first and second chamber solutions C1 and C2 to the reference value. If the ionic concentration of the first or second chamber solution C1 or C2 is determined to be more than the reference ionic concentration, then the control unit 320 controls the pump 330 to discharge and refill the anode or cathode chamber 210, 220, respectively.

As illustrated in FIG. 4, without a mixing block as will be described below, dialysis interference layers 400 may be formed at the respective boundaries between the first dialysis membrane 110 and the first chamber solution C1 and between the second dialysis membrane 120 and the second chamber solution C2. The density of the ionic materials 205 moving out of the sample is high at the dialysis interference layers 400. Thus, a mixing block is preferably provided to remove the dialysis interference layers 400. In the exemplary embodiment, the mixing block generates bubbles 261 (refer to FIGS. 2 and 3) in order to remove the dialysis interference layers 400 and increase flux of the first and second chamber solutions C1 and C2. Due to the increase in flux, the size of an interfacial area also increases. As a result, an ion diffusion rate and exchange rate increase.

Instead of the above-described mixing block, if a stirrer that mixes the first and second chamber solutions C1 and C2 is installed according to an exemplary embodiment of the present invention, a spacing distance D between the anode 211 and the cathode 221 may increase due to the installation space of the stirrer. However, the generation of the bubbles 261 in the above-described mixing block causes the first and second chamber solutions C1 and C2 to mix with each other. Hence, since the spacing distance D between the anode 211 and the cathode 221 can be minimized, the intensity of an electric field with respect to substantially the same voltage level can be maximized. As a result, electrodialysis efficiency can be improved. Consequently, the anode 211 and the cathode 221 are placed in such a manner that the spacing distance D within a range that allows the first and second chamber solutions C1 and C2 around the respective first and the second dialysis membranes 110 and 210 to move easily is minimal.

FIG. 3 illustrates a sectional view of the anode chamber 210. Although not illustrated, the cathode chamber 220 may have substantially the same configuration as the anode chamber 210.

In an exemplary embodiment of the control block 300, the housing 200 includes a chamber solution inlet 252 and a chamber solution outlet 253. The chamber solution inlet 252 supplies the first chamber solution C1 to the anode chamber 210, and the chamber solution outlet 253 discharges the first chamber solution C1 with increased ionic concentration to the outside. The control unit 320 (referring to FIG. 2) controls the driving of the pump 330 based on the electrical resistance or electrical conductivity of the target solution measured by the sensor unit 310 so as to supply and discharge the chamber solution, such as the first chamber solution C1 in the anode chamber 210 shown in FIG. 3.

In an exemplary embodiment of the mixing block, the housing 200 includes air supply openings 260 (only one opening is illustrated in FIG. 3), at least one air inlet 262, and at least one air outlet 263. The air supply openings 260 become air paths. The air inlet 262 supplies the bubbles 261 to the first chamber solution C1, and the air outlet 263 discharges the bubbles 261 to the outside. In the illustrated embodiment, a plurality of air inlets 262 are provided near a bottom or first end of the housing 200, closest to the air supply opening 260, and a plurality of air outlets 263 are provided near a top or second end of the housing 200.

Hereinafter, an exemplary electrodialysis method using the above described exemplary electrodialysis apparatus according to an exemplary embodiment of the present invention will be described in detail. The electrodialysis method includes arranging the first chamber solution C1, the first dialysis membrane 110, the sample, the second dialysis membrane 120, and the second chamber solution C2 in sequential order between the anode 211 and the cathode 221 that generate an electric field, and dialyzing the ionic materials 205 contained in the sample, due to the electric field, into the first and second chamber solutions C1 and C2. A molecular weight cutoff membrane may be used as the first and second dialysis membranes 110 and 120. The first chamber solution C1 is a chamber solution filling the anode chamber 210, while the second chamber solution C2 is a chamber solution filling the cathode chamber 220.

The sample chamber 100 includes the first and second dialysis membranes 110 and 120, and the sample may be placed between the first chamber solution C1 and the second chamber solution C2 through the slot 201 in the form of an integral cartridge type in the housing 200, or may be removed from the housing 200 by removing the sample chamber 100 from the slot 201. In other words, the sample chamber 100 is attachable to or detachable from the housing 200.

The control block 300 replaces the first chamber solution C1 with a new chamber solution when an ionic concentration of the first chamber solution C1 is higher than a reference ionic concentration. Similarly, the control block 300 replaces the second chamber solution C2 with a new chamber solution when an ionic concentration of the second chamber solution C2 is higher than the reference ionic concentration. When both the first and second chamber solutions C1 and C2 have the ionic concentrations higher than the reference ionic concentration, the first and second chamber solutions C1 and C2 are replaced with new chamber solutions.

An experimental example of the electrodialysis method using the exemplary electrodialysis apparatus illustrated in FIGS. 1 through 4 will now be described in detail.

As a comparison group to a test group according to an exemplary embodiment of the present invention, approximately 10 ml of a sample solution was put into approximately 2 L of deionized water, and a magnetic bar was rotated to make the deionized water flow. The deionized water was replaced every hour, and a salt removal rate with respect to the sample was measured. At this time, an electric field was not applied, and dialysis based only on a concentration difference was executed. After the experiment, the salt removal rates were measured to be approximately 4.8%, 25.6%, 38.3%, 55%, and 90.2% after the elapse of approximately 5 minutes, 30 minutes, 60 minutes, 120 minutes, and 720 minutes, respectively.

In a first experimental embodiment of the present invention, the electric field was applied to the anode 211 and the cathode 221, but the first and second chamber solutions C1 and C2 were not replaced with new solutions during the experiment. The amount of the sample of the test group was approximately 10 ml, and a voltage applied to both the anode 211 and the cathode 221 was approximately 30V. Cellophane membranes were used as the first and second dialysis membranes 110 and 120, and deionized water was used as the first and second chamber solutions C1 and C2. The amount of each of the first and second chamber solutions C1 and C2 was approximately 80 ml. Since the control block 300 was not used in this first experimental embodiment, the first and second chamber solutions C1 and C2 were not replaced with new solutions regardless of the ionic concentration. According to the first experimental embodiment, the salt removal rates were measured as being approximately 24.7%, 30.2%, and 34.4% after the elapse of approximately 1 minute, 2 minutes, and 3 minutes, respectively. The salt removal rate of the test group sample subjected to approximately 3 minutes of electrodialysis (e.g., approximately 34.4%) was substantially the same as that of the comparison group sample subjected to approximately 60 minutes of conventional dialysis (e.g., approximately 38.8%). The amount of deionized water used in the conventional dialysis (e.g., approximately 2 L), was significantly greater than the amount of the deionized water used for the electrodialysis according to the first experimental embodiment (approximately 160 mL). However, when the electrodialysis in the first experimental embodiment was executed for more than 3 minutes, severe electrodialysis occurred, resulting in increasing the temperature of the first and second chamber solutions C1 and C2 and a flow of the ionic materials 205 back to the sample.

In a second experimental embodiment, the electric field was again applied to the anode 211 and the cathode 221, but this time the first and second chamber solutions C1 and C2 were replaced with new solutions as necessary. The rest of the experimental conditions were substantially the same as those of the first experimental embodiment. When the first and second chamber solutions C1 and C2 contained an increasing amount of the ionic materials 205, the first and second chamber solutions C1 and C2 had decreasing levels of electrical resistance and increasing levels of electrical conductivity. In the second experimental embodiment, if the sensor unit 310 measured an electrical resistance of approximately 750 Ω or less in both of the first and second chamber solutions C1 and C2, the first and second chamber solutions C1 and C2 were replaced with new ones. If the first and second chamber solutions C1 and C2 were replaced with the new ones, since each of the anode chamber 210 and the cathode chamber 220 had an ionic concentration higher than a reference ionic concentration, the reference ionic concentration may be an ionic concentration corresponding to an electrical resistance of approximately 750Ω. According to the second experimental embodiment, the salt removal rate with respect to the sample increased to approximately 53% after approximately 3 minutes of electrodialysis.

In a third experimental embodiment, the electric field was again applied to the anode 211 and the cathode 221, the first and second chamber solutions C1 and C2 were again replaced with new ones, and this time the bubbles 261 were generated inside the first and second chamber solutions C1 and C2 to remove or prevent formation of dialysis interference layers 400. The rest of the experimental conditions were substantially the same as those of the second exemplary experimental embodiment. The salt removal rate with respect to the sample increased to approximately 75.5% after approximately 3 minutes of electrodialysis.

In summary, the salt removal rates at the same voltage level and electrodialysis time were approximately 34.4% when the electric field was simply applied to the anode 211 and the cathode 221 as in the first experimental embodiment, approximately 53% when the first and second chamber solutions C1 and C2 were replaced with new ones using the additionally provided control block 300 as in the second experimental embodiment, and approximately 75.5% when the dialysis interference layers 400 were removed using the additionally provided mixing block as in the third experimental embodiment.

In a fourth experimental embodiment, the experimental conditions were substantially the same as those described in the third experimental embodiment. However, a voltage of approximately 50V was applied to the anode 211 and the cathode 221 for an elongated period of time (e.g., approximately 5 minutes). Also, when the first and second chamber solutions C1 and C2 had an electrical resistance of approximately 1,666Ω or less, the first and second chamber solution C1 and C2 were replaced with new ones. In the fourth experimental embodiment, the reference ionic concentration became an ionic concentration corresponding to an electrical resistance of approximately 1,666Ω. As compared with the third experimental embodiment, the fourth experimental embodiment was set in conditions in which the intensity of the electric field increased, the voltage application time increased, and the reference ionic concentration decreased. That is, these conditions existed whereby the first and second chamber solutions C1 and C2 were replaced with new ones. In the case that urine was used as the sample in the fourth experimental embodiment, approximately 99.9% of salt could be removed within approximately 5 minutes of electrodialysis. In the case that whole blood was used as the sample, approximately 80% of salt could be removed within approximately 5 minutes of electrodialysis. Although the replacement of both the first and second chamber solutions C1 and C2 with new chamber solutions was described in the second through fourth experimental embodiments, one of the first and second chamber solutions C1 and C2 may be replaced with a new chamber solution when the above mentioned conditions are satisfied.

According to the above exemplary embodiments of the present invention, the electrodialysis apparatus and the electrodialysis method using the same provide several effects as follows.

Since the electrodialysis takes place using the molecular weight cutoff membrane, dialysis efficiency can be improved as compared to an electrodialysis method using the conventional dialysis membrane (e.g., an ion exchange membrane). Also, whole blood that is not diluted can advantageously be used as a PCR sample.

Also, the control block allows the replacement of a chamber solution with a new one before the chamber solution reaches a certain concentration. Thus, a diffusion rate based on an ionic concentration gradient increases, and this increasing diffusion rate makes it possible to remove salt contained in the sample within a short period of time. Since the amounts of hydrogen ions ($H^+$) and hydrogen oxide ions ($OH^-$) that are generated within the anode and cathode chambers can be reduced, it becomes unnecessary to use an expensive ion exchange membrane for the reduction of these ions. Also, salt removal efficiency can be improved since an ionic concentration gradient can be maximized.

Additionally, the mixing block that generates bubbles is used to increase the flux of the solutions around the dialysis membranes and the interfacial area. As a result, the thickness of the dialysis interference layers formed at the interfaces of the dialysis membranes decreases and the diffusion rate increases, so that an ion exchange rate can increase. Since the distance between the electrodes is shortened, and simultaneously the mixing efficiency increases, the intensity of an electric field can increase substantially at the same voltage level.

Furthermore, one or both of the chamber solutions can be replaced with a new one or with new ones by measuring electrical resistances or electrical conductivities of the anode chamber, the cathode chamber, and the sample chamber. That is, a minimum amount of each of the chamber solutions can be replaced during an optimal replacement period, and thus, the amount of chamber solution used can be reduced. Also, it is possible to prevent ions generated by the electrodialysis from flowing back to the sample.

Also advantageously, the individual chamber solutions are not replaced partially but entirely with a new one, and thus, electrodialyzed materials whose amount increases exponentially can be removed concurrently. As a result, an ionic concentration gradient can be maximized. Also, since the electrodialysis of the chamber solutions can be suppressed, heat generation occurring during the electrodialysis can be reduced. Thus, electrodialysis efficiency and sample damage can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrodialysis apparatus comprising:
    a sample chamber including first and second dialysis membranes and filled with a sample between the first dialysis membrane and the second dialysis membrane;
    an anode chamber including an anode and filled with a chamber solution between the anode and the first dialysis membrane; and
    a cathode chamber including a cathode and filled with a chamber solution between the cathode and the second dialysis membrane, wherein, when a voltage is applied to the anode and the cathode, ionic materials of the sample move to the anode and cathode chambers and wherein the anode chamber and the cathode chamber are on opposite sides of the sample chamber and in direct contact with the sample chamber; and
    a control block that is operative to replace substantially an entirety of at least one of the chamber solution in the anode chamber and the chamber solution in the cathode chamber with new chamber solution if the ionic concentration of the anode chamber or the cathode chamber is higher than the reference ionic concentration.

2. The electrodialysis apparatus of claim 1, wherein the first and second dialysis membranes each include a molecular weight cutoff membrane.

3. The electrodialysis apparatus of claim 2, wherein the molecular weight cutoff membrane includes one of a cellophane membrane, a cellulose membrane, a polyether sulfone membrane, a polysulfone membrane, a polyvinylidene fluoride membrane, and a combination including at least one of the foregoing.

4. The electrodialysis apparatus of claim 1, wherein the chamber solutions include deionized water.

5. The electrolysis apparatus of claim 1, wherein the control block controls an ionic concentration of each of the anode chamber and the cathode chamber to be lower than a reference ionic concentration.

6. The electrodialysis apparatus of claim 1, wherein the reference ionic concentration is lower than an ionic concentration of the sample chamber.

7. The electrodialysis apparatus of claim 1, wherein the control block comprises:
a sensor unit sensing the ionic concentrations of the anode chamber, the cathode chamber, and the sample chamber; and
a pump supplying chamber solutions to the anode chamber and the cathode chamber or discharging chamber solutions from the anode chamber and the cathode chamber.

8. The electrodialysis apparatus of claim 7, wherein the sensor unit senses the ionic concentrations of the anode chamber, the cathode chamber, and the sample chamber by measuring electrical resistance or electrical conductivity of each of the anode chamber, the cathode chamber, and the sample chamber.

9. The electrodialysis apparatus of claim 1, further comprising a mixing block causing the chamber solution of the anode chamber and the chamber solution of the cathode chamber to flow.

10. The electrodialysis apparatus of claim 9, wherein the mixing block generates bubbles inside the anode and cathode chambers.

11. The electrodialysis apparatus of claim 10, wherein the anode and the cathode are spaced apart from each other within a minimum distance range allowing smooth flux of the chamber solutions within the anode chamber and cathode chamber around the first and second dialysis membranes, respectively.

12. The electrodialysis apparatus of claim 1, wherein the sample chamber is formed in a tetragonal shape attachable to or detachable from a space between the anode chamber and the cathode chamber.

13. The electrodialysis apparatus of claim 1, wherein the sample chamber includes opposing walls having dialysis windows formed therein, the first and second dialysis membranes exposed to the chamber solutions through the dialysis windows.

14. An electrodialysis apparatus comprising:
a housing filled with chamber solutions; the housing comprising an anode chamber and a cathode chamber disposed on opposing sides of a sample chamber; the anode chamber and the cathode chamber being in direct contact with the sample chamber;
an anode and a cathode spaced apart from each other inside the housing and generating an electrical field;
a sample chamber filled with a sample between dialysis membranes of the sample chamber; the dialysis membranes being attachable to or detachable from the housing, wherein each of the dialysis membranes forms a wall isolating a corresponding chamber solution from the sample, and ionic materials contained in the sample move to the chamber solutions through corresponding dialysis membranes due to the electric field; and
a control block that is operative to replace substantially an entirety of at least one of the chamber solution in the anode chamber and the chamber solution in the cathode chamber with new chamber solution if an ionic concentration of the anode chamber or the cathode chamber is higher than a reference ionic concentration.

15. The electrodialysis apparatus of claim 14, wherein the dialysis membranes each include a molecular weight cutoff membrane.

16. The electrodialysis apparatus of claim 14, wherein the chamber solutions include deionized water.

17. The electrodialysis apparatus of claim 14, wherein the control block controls the ionic concentrations of the chamber solutions to be lower than a reference ionic concentration.

18. The electrodialysis apparatus of claim 10, wherein the control block senses the ionic concentrations of the chamber solutions by measuring electrical resistance or electric conductivity of each of the chamber solutions and sample.

19. The electrodialysis apparatus of claim 14, further comprising a mixing block generating bubbles to make the chamber solutions flow.

20. The electrodialysis apparatus of claim 14, wherein the sample chamber is formed in a tetragonal shape, and the dialysis membranes are formed on opposing sides of the sample chamber.

21. An electrodialysis apparatus comprising:
an anode and a cathode generating an electric field;
first and second dialysis membranes;
first and second chamber solutions;
a sample, wherein the first chamber solution, the first dialysis membrane, the sample, the second dialysis membrane, and the second chamber solution are arranged in sequential order between the anode and the cathode, ionic materials contained in the sample are dialyzed into the first and second chamber solutions due to the electric field, and the first and second dialysis membranes include a molecular weight cutoff membrane; and
a control block that is operative to replace substantially an entirety of at least one of the first chamber solution in an anode chamber and the second chamber solution in a cathode chamber with new chamber solution if an ionic concentration of the anode chamber or the cathode chamber is higher than a reference ionic concentration.

22. The electrodialysis apparatus of claim 21, further comprising a mixing block generating bubbles removing dialysis interference layers formed at interfaces between the first dialysis membrane and the first chamber solution and between the second dialysis membrane and the second chamber solution.

23. The electrodialysis apparatus of claim 21, wherein the anode and the cathode are spaced a minimum distance apart from each other.

24. An electrodialysis method comprising:
arranging a first chamber solution, a first dialysis membrane, a sample, a second dialysis membrane, and a second chamber solution in sequential order in between an anode and a cathode that are generating an electric field; and a control block that is operative to replace substantially an entirety of at least one of the first chamber solution in a first chamber and the second chamber solution in a second chamber with new chamber solution if an ionic concentration of the first chamber or the second chamber is higher than a reference ionic concentration;

dialyzing ionic materials contained in the sample into the first and second chamber solutions based on the electric field, wherein the first and second dialysis membranes include a molecular weight cutoff membrane.

25. The electrodialysis method of claim 24, further comprising replacing substantially an entirety of the first or second chamber solution with new chamber solution if the first or second chamber solution has an ionic concentration substantially same as or higher than a reference ionic concentration.

26. The electrodialysis method of claim 24, further comprising generating bubbles moving the first and second chamber solutions.

27. The electrodialysis method of claim 26, further comprising spacing the anode and the cathode a minimum distance from each other in order to maximize intensity of the electric field.

28. The electrodialysis method of claim 24, further comprising filling the sample between the first dialysis membrane and the second dialysis membrane in an integral cartridge type form of chamber, attachable to or detachable from a space between the first chamber solution and the second chamber solution.

29. The method of claim 24, wherein arranging the sample includes arranging one of whole blood or urine and dialyzing ionic materials contained in the sample includes removing a majority of polymerase chain reaction inhibitors within the sample in less than ten minutes.

* * * * *